(12) United States Patent
Karch et al.

(10) Patent No.: US 12,275,537 B2
(45) Date of Patent: Apr. 15, 2025

(54) STRUCTURAL PART FOR LIGHTNING STRIKE PROTECTION

(71) Applicant: Airbus Defence and Space GmbH, Taufkirchen (DE)

(72) Inventors: Christian Karch, Taufkirchen (DE); Kay Dittrich, Taufkirchen (DE); Matthias Bleckmann, Taufkirchen (DE); Thomas Schuster, Taufkirchen (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 266 days.

(21) Appl. No.: 17/961,063

(22) Filed: Oct. 6, 2022

(65) Prior Publication Data
US 2023/0150689 A1    May 18, 2023

(30) Foreign Application Priority Data
Nov. 16, 2021 (EP) .................................... 21208561

(51) Int. Cl.
  *B64D 45/02*       (2006.01)
  *B32B 1/00*         (2006.01)
  (Continued)

(52) U.S. Cl.
  CPC ................. *B64D 45/02* (2013.01); *B32B 1/00* (2013.01); *B32B 3/08* (2013.01); *B32B 5/02* (2013.01);
  (Continued)

(58) Field of Classification Search
  CPC ........ H02G 13/80; H02G 13/40; H02G 13/00; B64D 45/02; B32B 1/00; B32B 3/08;
  (Continued)

(56) References Cited

U.S. PATENT DOCUMENTS

| | | | | |
|---|---|---|---|---|
| RE25,417 E | * | 7/1963 | AMason ................. | B64D 45/02 174/2 |
| 4,237,514 A | * | 12/1980 | Cline ...................... | H02G 13/80 361/220 |

(Continued)

FOREIGN PATENT DOCUMENTS

| | | |
|---|---|---|
| EP | 2778071 A1 | 9/2014 |
| WO | 0014405 A1 | 3/2000 |

OTHER PUBLICATIONS

Extended European Search Report for Application No. 21208561.7 dated Apr. 14, 2022. 7 pgs.

*Primary Examiner* — Angel R Estrada
(74) *Attorney, Agent, or Firm* — Lerner David LLP

(57) ABSTRACT

A structural part for lightning strike protection, preferably of an aircraft includes a first structure element, wherein the first structure element includes a conducting material and is adapted to conduct electric currents into a grounded conducting airframe structure, and a second structure element, wherein the second structure element includes an outer layer with a first surface, wherein the outer layer includes a composite, preferably carbon-fibre reinforced plastic, CFRP or glass-fibre reinforced plastic GFRP. The structural part further includes a first elongated, preferably wedge-shaped, electrical conductor, with a first end and a second end, wherein the first end of the first elongated electrical conductor is connected to the first structure element and extends through the second structure element to the first surface, so that the second end of the first elongated electrical conductor serves as a lightning receptor without impairing the radar cross section of the aircraft.

13 Claims, 3 Drawing Sheets

(51) Int. Cl.
*B32B 3/08* (2006.01)
*B32B 5/02* (2006.01)
*B32B 15/14* (2006.01)
*H02G 13/00* (2006.01)
*B32B 15/20* (2006.01)

(52) U.S. Cl.
CPC ............. *B32B 15/14* (2013.01); *H02G 13/80* (2013.01); *B32B 15/20* (2013.01); *B32B 2255/06* (2013.01); *B32B 2255/205* (2013.01); *B32B 2260/021* (2013.01); *B32B 2260/046* (2013.01); *B32B 2262/101* (2013.01); *B32B 2262/106* (2013.01); *B32B 2307/202* (2013.01); *B32B 2307/212* (2013.01); *B32B 2307/712* (2013.01); *B32B 2605/18* (2013.01)

(58) Field of Classification Search
CPC ........... B32B 5/02; B32B 15/14; B32B 15/20; B32B 2255/205; B32B 2260/021; B32B 2260/046; B32B 2262/101; B32B 2262/106; B32B 2307/202; B32B 2307/712; B32B 2605/18
USPC ........... 174/2, 1, 3, 5 R, 5 SG; 361/117, 212
See application file for complete search history.

(56) References Cited

U.S. PATENT DOCUMENTS

| | | | | |
|---|---|---|---|---|
| 4,796,153 | A * | 1/1989 | Amason | B64D 45/02 361/218 |
| 4,824,713 | A * | 4/1989 | Brick | H05F 3/00 174/2 |
| 6,457,943 | B1 * | 10/2002 | Olsen | F03D 80/30 416/241 A |
| 8,999,097 | B2 * | 4/2015 | Gehrett | B64D 45/02 174/2 |
| 9,708,076 | B2 * | 7/2017 | Jones | B64D 45/02 |
| 11,518,540 | B2 * | 12/2022 | Weber | B64D 45/02 |
| 2019/0382129 | A1 | 12/2019 | Weber | |

* cited by examiner

STRUCTURAL PART FOR LIGHTNING STRIKE PROTECTION

FIELD OF THE INVENTION

The description relates to a structural part for lightning strike protection and an aircraft comprising said structural part. In particular, the description relates to a structural part for lightning strike protection of an aircraft.

BACKGROUND OF THE INVENTION

The camouflage of military fighter aircraft and equipment from radar detection is an increasingly common demand for current and future weapon systems. There are various possibilities to decrease the detectability, respectively the radar cross section, RCS, by means of radar absorbing material, RAM or, radar absorbing structure RAS. In case of RAS, the aircraft structure, strictly speaking the materials used for the structural parts, is modified to get radar absorbing properties. One known and common method is here to use layered structures or directly gradient materials with variable permittivity as well as permeability. The lightning protection of RAM/RAS structure is a contradiction in terms. On the one hand, the application of any metallic structures onto the surface of RAS which increases the RCS signature of the airframe structure has to be avoided. On the other hand, a metallic structure is necessary to divert the lightning current load safely into the grounded conducting airframe structure and to therefore provide an efficient lightning protection measure of the airframe structure. Experimental tests have shown that RAM or RAS structures increase the lightning-induced thermo-mechanical damage, causing not only severe damage of the RAM or RAS structures but also severe puncture of the composite supporting structure. The standard lightning protection measures like expanded or perforated copper foils have to be applied between the RAS and composite airframe structures. In case of a lightning strike, the plasma channel will penetrate the RAS structures. However, the RAS structures are unable to conduct high electric currents due to the rather low electrical conductivity of these structures. The rapid vaporisation of the thermally low resistant RAS constituents leads to an explosion inside the RAS structures and therefore to a severe damage of the heterogeneous RAS structures. The explosion can also result in the penetration of the composite carbon-fibre reinforced plastic, CFRP, or glass-fibre reinforced plastic, GFRP structures. The damage of the RAS structures can be partially reduced—but not completely avoided—by a significant increase of the surface weight of the copper-based protection measures. The penetration of composite structures can be prevented by increasing significantly the mechanical strength or the thickness of the supporting structures. Both mentioned measures are, however, entailed with a significant increase of the weight of stealth airframe structures. The RCS signature, or strictly speaking, the reflection coefficient of the incident EM wave, is impaired by the lightning-induced damage if the damage size is greater than a one-half free-space wavelength. In case of multi-layered RAS structures, the relevant damage size is related to the size of the non-visible delamination between the different layers.

BRIEF SUMMARY OF THE INVENTION

An aspect of the disclosure may relate to providing sufficient lightning strike protection, LSP, performance of RAS structure without impairing the RCS and increasing significantly the weight of the protected low observability, LO, aircraft structure.

According to an aspect, a structural part for lightning strike protection, preferably of an aircraft, comprises a first structure element, wherein the first structure element comprises a conducting material and is adapted to conduct electric currents into a grounded conducting airframe structure. The structural part further comprises a second structure element, wherein the second structure element comprises an outer layer with a first surface, wherein the outer layer comprises a composite, preferably carbon-fibre reinforced plastic, CFRP, or glass-fibre reinforced plastic, GFRP. The structural part further comprises a first elongated, preferably wedge-shaped, electrical conductor, with a first end and a second end. The first end of the first elongated electrical conductor is connected to the first structure element and extends through the second structure element to the first surface. The second end of the first elongated electrical conductor thereby serves as a lightning receptor without impairing the radar cross section, RCS, of the aircraft.

RCS is a measure of how detectable an object is by radar. Therefore, it is called electromagnetic signature of the object. A larger RCS indicates that an object is more easily detected. An object reflects a limited amount of radar energy back to the source. The factors that influence this include the material with which the target is made, the size of the target relative to the wavelength of the illuminating radar signal, the absolute size of the target, the incident angle, the reflected angle, the polarization of the transmitted and the received radiation with respect to the orientation of the target. The incident angle is the angle at which the radar beam hits a particular portion of the target, which depends upon the shape of the target and its orientation to the radar source, while the reflected angle is the angle at which the reflected radar beam leaves the part of the target hit. The reflected angle depends upon the incident angle.

The structural part for lightning strike protection provides safe conductive paths between the entry and exit points to a grounded conducting airframe structure to prevent damage to electronic equipment and to protect flammable fuel or cargo from sparks.

According to an embodiment, the structural part further comprises a second elongated, preferably wedge-shaped, electrical conductor with a first end and a second end. The first end of the second elongated electrical conductor is connected to the first structure element and extends through the second structure element to the first surface, so that the second end of the second elongated electrical conductor serves as a lightning receptor without impairing the radar cross section of the aircraft.

An additional second elongated, preferably wedge-shaped, electrical conductor serving as a lightning receptor shall be provided preferably along the length of a leading edge or an aircraft component. The approximate distance between the lightning receptors along the length is about 350 to 450 mm. The optimized solution may be obtained by performing high voltage streamer-leader attachment tests. The high voltage streamer-leader attachment tests may be also used to find the optimal/minimum number of receptors located at a cross section of the leading edge or the aircraft component. Since an increasing number of electrical conductors serving as a lightning receptors affects the RCS disadvantageously, a minimum of lightning receptors is requested.

According to an embodiment, the first elongated electrical conductor is arranged in the second structure element in a first orientation, wherein the first orientation is adapted to be aligned parallel to the rolling axis of the aircraft.

The rolling axis is drawn through the body of the aircraft from tail to nose in the normal direction of flight, or the direction the pilot faces. This orientation is advantageous for lightning strikes from above the aircraft.

According to an embodiment, the second elongated electrical conductor is arranged in the second structure element in a second orientation, wherein the second orientation is adapted to be aligned parallel to the yaw axis of the aircraft.

The yaw axis is drawn from top to bottom of the aircraft, and perpendicular to the other rolling axis and the pitch axis, parallel to the wings of a winged aircraft.

According to an embodiment, the second structure element comprises a radar absorbing material. A radar absorbing material, usually known as RAM, is a material which has been specially designed and shaped to absorb incident radio frequencies, RF, radiation, also known as non-ionising radiation, as effectively as possible, from as many incident directions as possible. The more effective the RAM, the lower the resulting level of reflected RF radiation. Hence, radar absorbing materials are used in stealth technology to disguise an aircraft or a structure from radar detection. A material's absorbency at a given frequency of radar wave depends upon its composition. RAM cannot perfectly absorb radar at any frequency, but any given composition does have greater absorbency at some frequencies than others.

One of the most commonly known types of RAM is iron ball paint. It contains tiny spheres coated with carbonyl iron or ferrite. Radar waves induce molecular oscillations from the alternating magnetic field in the paint, which leads to conversion of the radar energy into heat. The heat is then transferred to the aircraft and dissipated. The iron particles in the paint are obtained by decomposition of iron pentacarbonyl and may contain traces of carbon, oxygen, and nitrogen.

Another type of RAM is a foam absorber, which is used as lining of anechoic chambers for electromagnetic radiation measurements. This material typically consists of a fireproofed urethane foam loaded with conductive carbon black, for example carbonyl iron spherical particles, and/or crystalline graphite particles, in mixtures between 0.05% and 0.1% by weight in finished product, and cut into square pyramids with dimensions set specific to the wavelengths of interest. Further improvements can be made when the conductive particulates are layered in a density gradient, so the tip of the pyramid has the lowest percentage of particles and the base contains the highest density of particles.

Another type of RAM are split-ring resonators, SRRs. SRR technology can be used in conjunction with the technologies above to provide a cumulative absorption effect. SRR technology is particularly effective when used on faceted shapes that have perfectly flat surfaces that present no direct reflections back to the radar source. A SRR is an artificially produced structure common to metamaterials. Their purpose is to produce the desired magnetic susceptibility, or magnetic response, in various types of metamaterials up to 200 terahertz. These media create the necessary strong magnetic coupling to an applied electromagnetic field.

Another possible type is the usage of multi-wall nanotubes, MWNTs. Radars work in the microwave frequency range, which can be absorbed by MWNTs. Applying the MWNTs to the aircraft causes the radar to be absorbed and therefore seem to have a smaller radar cross-section.

According to another embodiment, the second structure element comprises a radar absorbing structure, RAS, preferably a dielectric layered structure.

RAS, typically made of fiber reinforced composite materials, provide electromagnetic wave absorption and external load support simultaneously, while RAM is generally applied on a surface of the object.

According to another embodiment, the second structure element comprises a metallic layer, preferably a copper layer, more preferably an expanded or perforated copper foil. Copper is a soft, malleable, and ductile metal with very high thermal and electrical conductivity.

According to an embodiment, a diameter of the first elongated electrical conductor and/or the second elongated electrical conductor is more than 3 mm, preferably more than 3.5 mm, more preferably more than 4 mm. The elongated electrical conductor is preferably wedge-shaped. Hence, the diameter refers to the first end connected to the first structure element.

The dimension and the diameter of the wedge-shaped electrical conductors depend on the lightning load and lightning zoning and can be determined by a coupled electro-thermal simulation of the lighting current.

According to another embodiment, the first elongated electrical conductor and/or the second elongated electrical conductor comprise a coating anti-corrosion and anti-erosion layer, wherein the layer is preferably a nickel or chrome film, preferably with a thickness of 1 to 100 μm. Nickel is slow to react with air under standard conditions because an oxide layer forms on the surface and prevents further corrosion. Chrome also shows high corrosion resistance and hardness.

Hence, the elongated electrical conductor shall be coated by thin nickel or chrome films in order to reduce potential corrosion and erosion effects of the soft copper material. The shape of the lightning receptors at the outer surface of the RAS shall fit to the RAS surface completely.

According to an embodiment, the first elongated electrical conductor and/or the second elongated electrical conductor comprise copper.

According to an embodiment, the first elongated electrical conductor and/or the second elongated electrical conductor comprise aluminium. Aluminium has a density lower than those of other common metals, at approximately one third that of steel. It has a great affinity towards oxygen, and forms a protective layer of oxide on the surface when exposed to air.

According to an embodiment, the first elongated electrical conductor and/or the second elongated electrical conductor comprise a, preferably wedge shaped, magnetic absorber, preferably comprising magnetic particles.

The, preferably thin, wedge-shaped magnetic absorber may be placed at the interface between the nickel coated lightning receptor and the RAS structure in order to reduce potential surface wave that might decouple and radiate at material interfaces and geometrical transitions. The optimum thickness, strictly speaking the maximum possible thickness at the right edge of the magnetic absorber connected to the conducting aircraft structure can be for example determined numerically by calculation of the attenuation constant of the TM surface wave.

According to an embodiment, the second structure element comprises an edge.

An edge is defined as the outside limit of an object, area, or surface.

According to an embodiment, the structural part is wedge-shaped, preferably a wing. Other possible embodiments for wedge-shaped structural parts are air inlets, air outlets or winglets.

According to another aspect, an aircraft comprises a structural part with the above-mentioned features. An aircraft is a vehicle or machine that is able to fly by gaining support from the air. It counters the force of gravity by using either static lift or by using the dynamic lift of an airfoil, or in a few cases the downward thrust from jet engines. Common examples of aircraft include airplanes, helicopters, airships, gliders, paramotors or drones.

BRIEF DESCRIPTION OF THE DRAWINGS

The subject matter will hereinafter be described in conjunction with the following drawing figures, wherein like numerals denote like elements, and wherein.

DETAILED DESCRIPTION OF THE DRAWINGS

Figure 1:
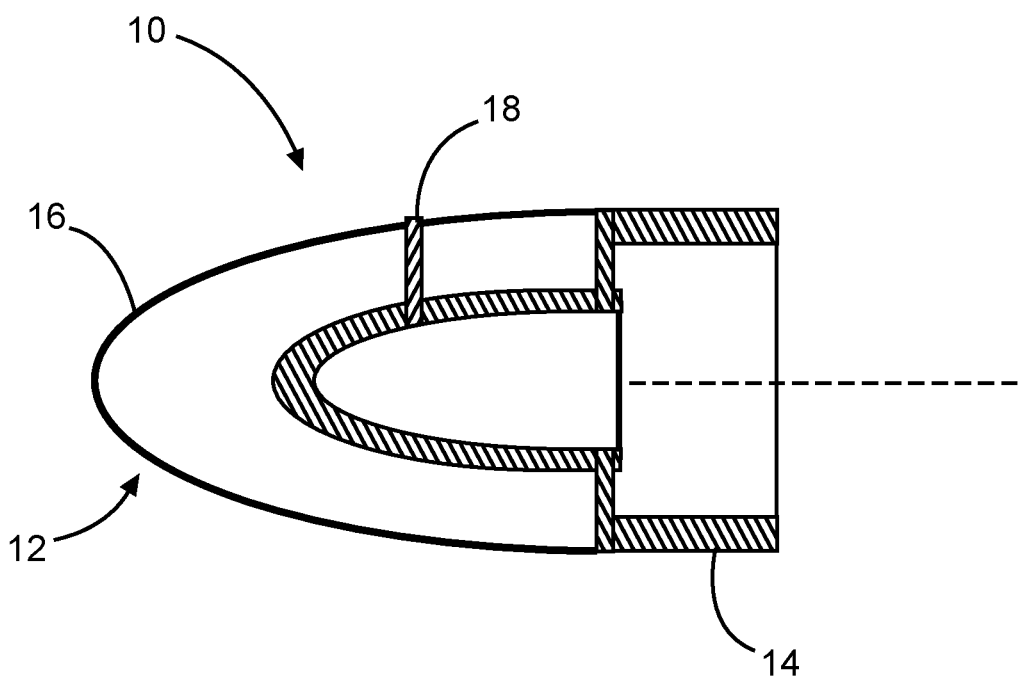
FIG. 1 is a schematic representation of a structural part for lightning strike protection.

The following detailed description is merely exemplary in nature and is not intended to limit the invention and uses of the invention. Furthermore, there is no intention to be bound by any theory presented in the preceding background or the following detailed description.

The representations and illustrations in the drawings are schematic and not to scale. Like numerals denote like elements.

A greater understanding of the described subject matter may be obtained through a review of the illustrations together with a review of the detailed description that follows.

FIG. 1 shows a schematic representation of a structural part 10 for lightning strike protection. The structural part 10 comprises a first structure element 12, wherein the first structure element 12 comprises a conducting material and is adapted to conduct electric currents into a grounded conducting airframe structure (not shown).

The structural part 10 further comprises a second structure element 14, wherein the second structure element 14 comprises an outer layer with a first surface 16, wherein the outer layer comprises a composite, preferably carbon-fibre reinforced plastic, CFRP or glass-fibre reinforced plastic GFRP. CFRP and GFRP are composite materials. The composite consists of a matrix and a reinforcement. In CFRP the reinforcement is carbon fiber, while in GFRP the reinforcement is glass fibre, each providing the strength. The matrix is usually a polymer resin, such as epoxy, to bind the reinforcements together. Because CFRP and GFRP consist of two distinct components, the material properties depend on these two components.

The first structural part 10 further comprises a first elongated, preferably wedge-shaped, electrical conductor 18, with a first end and a second end, wherein the first end of the first elongated electrical conductor 18 is connected to the first structure element 12 and extends through the second structure element 14 to the first surface 16, so that the second end of the first elongated electrical conductor 18 serves as a lightning receptor without impairing the radar cross section of the aircraft.

Figure 2:
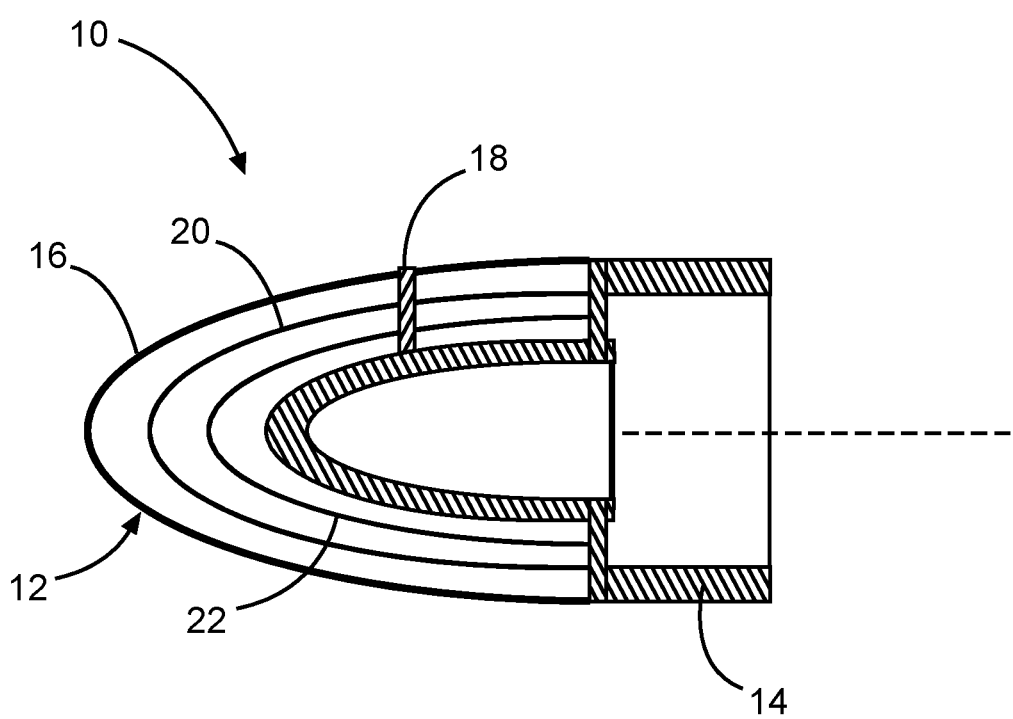
FIG. 2 is another schematic representation of a structural part for lightning strike protection according to FIG. 1 with a radar absorbing material and a radar absorbing structure.

FIG. 2 shows a schematic representation of a structural part 10 for lightning strike protection according to FIG. 2. The structural part 10 further comprises a radar absorbing material, RAM, 20 and a radar absorbing structure, RAS, 22, preferably a dielectric layered structure. The RAM 20 is arranged on the RAS 22 between the outer layer 16 and the first structure element.

Figure 3:
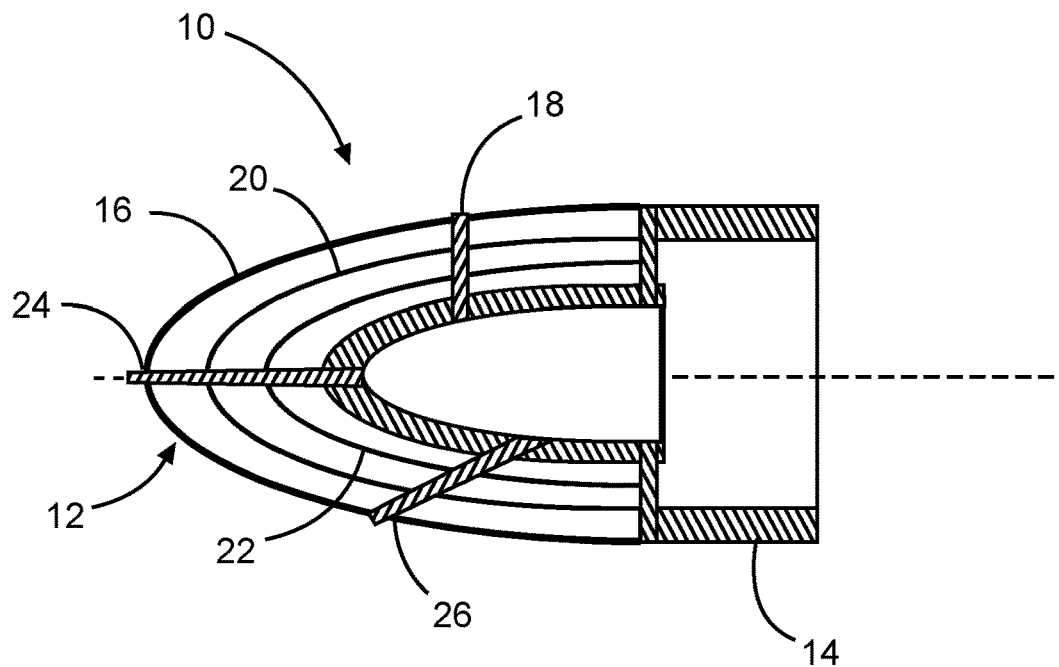
FIG. 3 is another schematic representation of a structural part for lightning strike protection according to FIG. 2 with a second and a third electrical conductor.

FIG. 3 shows a schematic representation of a structural part 10 for lightning strike protection according to FIG. 2. The structural part 10 further comprises a second elongated, preferably wedge-shaped, electrical conductor 24 with a first end and a second end, wherein the first end of the second elongated electrical conductor 24 is connected, similar to the first elongated electrical conductor 18, to the first structure element 12 and extends through the second structure element 14 to the first surface 16, so that the second end of the second elongated electrical conductor 24 serves as a lightning receptor without impairing the radar cross section of the aircraft. The first elongated electrical conductor 18 is arranged in the second structure element 14 in a first orientation, wherein the first orientation is adapted to be aligned parallel to the rolling axis of the aircraft. The second elongated electrical conductor 24 is arranged in the second structure element 14 in a second orientation, wherein the second orientation is adapted to be aligned parallel to the yaw axis of the aircraft. There may be additional elongated, preferably wedge-shaped, electrical conductors, exemplary shown by a third elongated electrical conductor 26. The orientation is preferably aligned with the expected incident angle of the radar beam.

FIG. 3 shows a schematic representation of a structural part 10 for lightning strike protection according to FIG. 3. The second elongated electrical conductor 24 comprises a wedge-shaped magnetic absorber 28. The magnetic absorber 28 comprises magnetic particles and preferably surrounds the second elongated electrical conductor 24. The wall thickness may vary or may be constant along the axis of the elongated electrical conductor. The second elongated electrical conductor 24 is only exemplary. The magnetic absorber 28 may also applied to the first elongated electrical conductor 18 or the second elongated electrical conductor 24.

Figure 4:
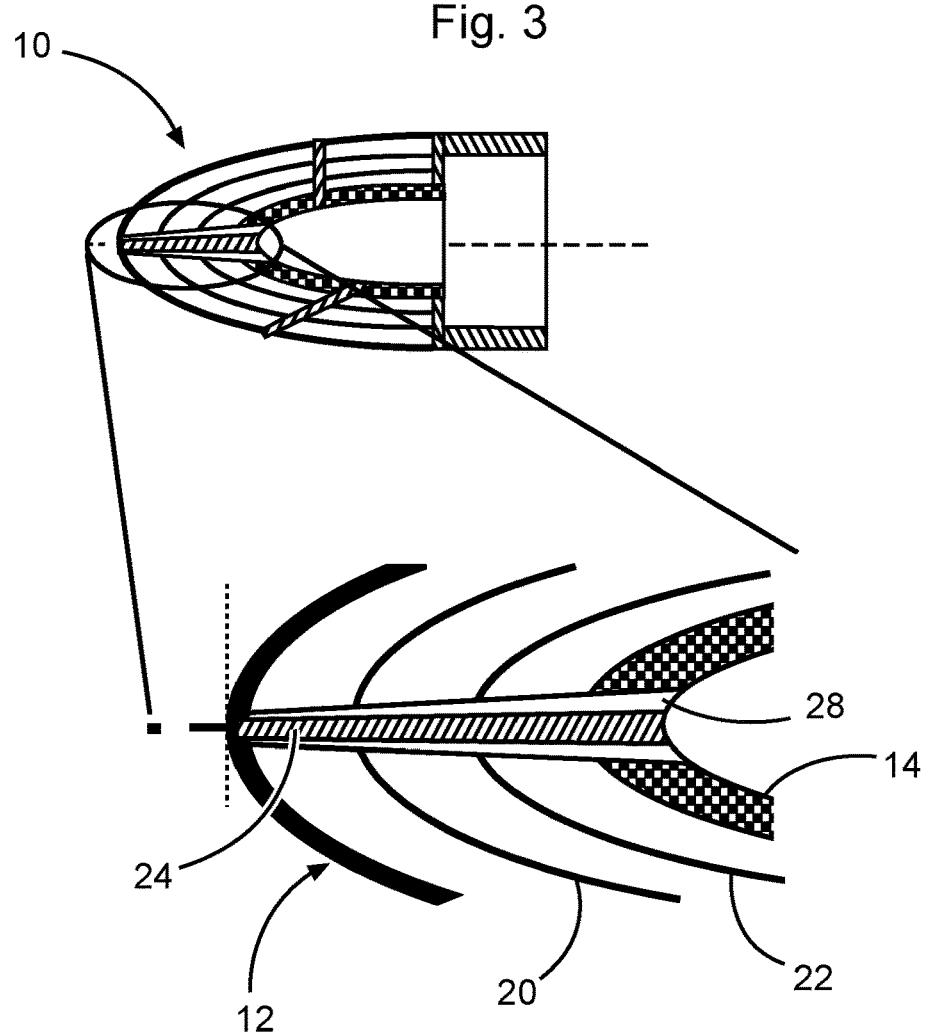
FIG. 4 is another schematic representation of a structural part for lightning strike protection according to FIG. 3 with a wedge-shaped magnetic absorber.
Figure 5:
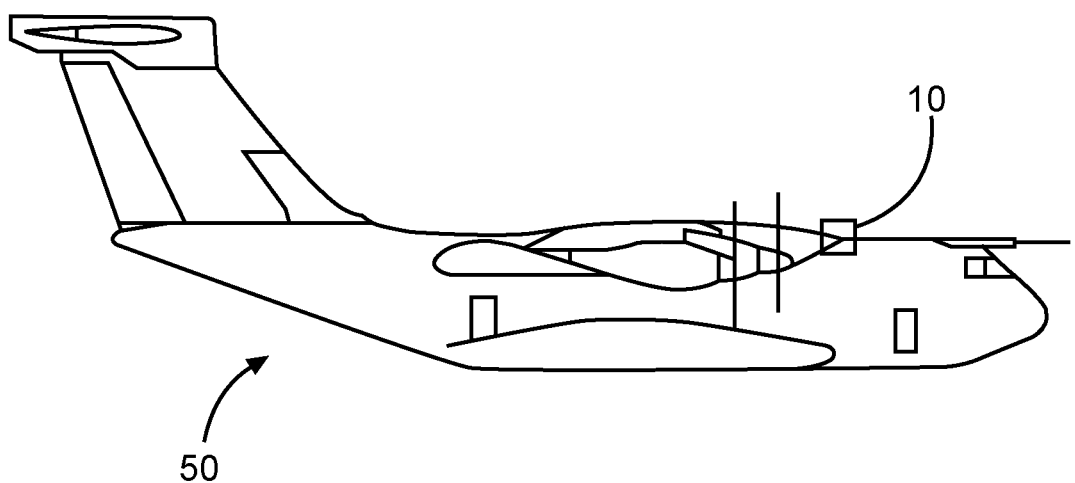
FIG. 5 is a schematic representation of an aircraft comprising a structural part for lightning strike protection.

FIG. 4 shows a schematic representation of an aircraft 50 comprising a structural part 10 for lightning strike protection. In this embodiment the structural part 10 is a wing. Other examples of aircrafts include airplanes, helicopters, airships, gliders, paramotors or drones.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It will be understood that various changes may be made in the function and arrangement of elements described in an exemplary embodiment without departing from the scope of the claims.

Additionally, it is noted that "comprising" or "including" does not exclude any other elements and "a" or "an" does not exclude a multitude or plurality. It is further noted that features which are described with reference to one of the above exemplary embodiments may also be used in combination with other features of other exemplary embodiments described above. Reference signs in the claims are not to be construed as a limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 structural part
12 first structural element
14 second structural element
16 first surface
18 first elongated electrical conductor
20 radar absorbing material
22 radar absorbing structure
24 second elongated electrical conductor
26 third elongated electrical conductor
28 magnetic absorber
50 aircraft

The invention claimed is:

1. An aircraft comprising a structural part for lightning strike protection of the aircraft,
wherein the structural part comprises:
a first structure element, wherein the first structure element comprises a conducting material and is adapted to conduct electric currents into a grounded conducting airframe structure,
a second structure element, wherein the second structure element comprises an outer layer with a first surface, wherein the outer layer comprises a composite; comprising carbon-fibre reinforced plastic, (CFRP) or glass-fibre reinforced plastic (GFRP),
a first elongated, electrical conductor, with a first end and a second end, wherein the first end of the first elongated electrical conductor is connected to the first structure element and extends through the second structure element to the first surface, so that the second end of the first elongated electrical conductor serves as a lightning receptor without impairing the radar cross section of the aircraft,
wherein the first elongated electrical conductor is arranged in the second structure element in a first orientation, and
wherein the first orientation is adapted to be aligned parallel to the rolling axis of the aircraft.

2. The structural craft, according to claim 1,
the structural part further comprising a second elongated, electrical conductor with a first end and a second end,
wherein the first end of the second elongated electrical conductor is connected to the first structure element and extends through the second structure element to the first surface,
so that the second end of the second elongated electrical conductor serves as a lightning receptor without impairing the radar cross section of the aircraft.

3. The aircraft according to claim 2,
wherein the second elongated electrical conductor is arranged in the second structure element in a second orientation,
wherein the second orientation is adapted to be aligned parallel to the yaw axis of the aircraft.

4. The aircraft according to claim 1,
wherein the second structure element comprises a radar absorbing material.

5. The aircraft according to claim 1,
wherein the second structure element comprises a radar absorbing structure.

6. The aircraft according to claim 1,
wherein the second structure element comprises a metallic layer.

7. The aircraft according to claim 2,
wherein a diameter of the first elongated electrical conductor and/or the second elongated electrical conductor is more than 3 mm.

8. The aircraft according to claim 2,
wherein the first elongated electrical conductor and/or the second elongated electrical conductor comprises a coating anti-corrosion and anti-errosion layer.

9. The aircraft according to claim 2,
wherein the first elongated electrical conductor and/or the second elongated electrical conductor comprise copper.

10. The aircraft according to claim 2,
wherein the first elongated electrical conductor and/or the second elongated electrical conductor comprise aluminium.

11. The aircraft according to claim 2,
wherein the first elongated electrical conductor and/or the second elongated electrical conductor comprise a magnetic absorber.

12. The aircraft structural part, according to claim 1,
wherein the second structure element comprises an edge.

13. The aircraft according to claim 1, wherein the structural part is wedge-shaped.

* * * * *